United States Patent [19]

Nortrup

[11] Patent Number: 5,180,934
[45] Date of Patent: Jan. 19, 1993

[54] SELF-ENABLING DATA-COLLISION AVOIDANCE ARRANGEMENT USING A PEAK DETECTOR

[75] Inventor: Kevin E. Nortrup, Indianapolis, Ind.

[73] Assignee: Thomson Consumer Electronics, Inc., Indianapolis, Ind.

[21] Appl. No.: 705,613

[22] Filed: May 28, 1991

[51] Int. Cl.⁵ .................... H03K 5/22; H03K 17/28
[52] U.S. Cl. .................... 307/518; 307/243; 307/246; 307/355; 307/592; 307/603; 370/85.2; 370/85.9
[58] Field of Search ............ 307/243, 246, 355, 357, 307/517, 518, 592, 601, 603; 340/825.08, 825.12, 825.5, 870.13, 870.14; 370/85.2, 85.9

[56] References Cited

U.S. PATENT DOCUMENTS

| | | | |
|---|---|---|---|
| 3,952,212 | 4/1976 | Matsumoto et al. | 307/243 |
| 4,269,496 | 5/1981 | Hotoori et al. | 307/603 |
| 4,390,988 | 6/1983 | Best et al. | 307/243 |
| 4,503,513 | 3/1985 | Pogue, Jr. | 364/900 |
| 4,574,201 | 3/1986 | Ohyama et al. | 307/243 |
| 4,577,124 | 3/1986 | Koike | 307/243 |
| 4,617,473 | 10/1986 | Bingham | 307/362 |
| 4,712,026 | 12/1987 | Pigott | 307/603 |
| 4,740,952 | 4/1988 | Vernieres et al. | 370/24 |
| 4,894,565 | 1/1990 | Marquardt | 307/518 |
| 4,900,951 | 2/1990 | Saito et al. | 307/296.4 |

Primary Examiner—William L. Sikes
Assistant Examiner—Terry D. Cunningham
Attorney, Agent, or Firm—Joseph S. Tripoli; Peter M. Emanuel; Robert D. Shedd

[57] ABSTRACT

In a system for communicating between multiple signal sources and at least one destination, communications occur via a communications, line shared by the signal sources. The multiple signal sources are coupled to the shared communications line via respective interface circuits. The interface circuits operate to determine which signal source will control the shared communications line. The operation of the interface circuits involves a switching or enabling function responsive to signal activity from one of the signal sources. The switching operation also involves assigning relative priorities to the signal sources. The priortizing feature results from an interaction between the relative impedances of the signal sources and the destination.

15 Claims, 3 Drawing Sheets

SELF-ENABLING DATA-COLLISION AVOIDANCE ARRANGEMENT USING A PEAK DETECTOR

FIELD OF THE INVENTION

The present invention relates to interface circuitry for controlling communications between multiple electronic components that are coupled to a shared communications link.

BACKGROUND OF THE INVENTION

A shared communications link, e.g. a digital bus, typically incorporates features for controlling access of the signal sources to the communications link. Failure to provide adequate means for allocating access may cause unintentional collisions of signals from different signal sources that are simultaneously attempting to transmit over the shared communications link. Unexpected collisions may cause a loss of communications integrity and damage hardware that is connected to the communications line.

Various approaches to allocating access to a communications link are known, including access arbitration and priority assignment. As an example, U.S. Pat. No. 4,894,565 (Marquardt) entitled ASYNCHRONOUS DIGITAL ARBITER, issued Jan. 16, 1990, discloses an arbiter circuit for determining which of two asynchronous digital "chip select" signals will control communication with a shared random access memory (RAM). The arbitration opertion involves assigning priorities and generating "communications channel busy" signals to notify signal sources when the communications channel is in use.

As in the embodiment disclosed by Marquardt, known approaches to allocating access to a shared communications line may require numerous costly circuit components and extremely specific signal formats, e.g. chip select pulses. These requirements may undesirably limit the applicability of known circuits.

SUMMARY OF THE INVENTION

In accordance with a feature of the present invention, multiple signal sources are connected via interface circuits to a shared communications line for communicating with at least one signal destination. Access to the communications line is controlled, for example, by enabling the interface circuits in response to transitions of one of the signals from the signal sources. In addition, a priority scheme based on relative signal path impedances is included. The disclosed interface approach may be implemented with very few components and does not require separate clock or enable signal sources.

In accordance with another feature of the present invention, the disclosed interface scheme may be used for asynchronous signal sources exhibiting a variety of signal formats including either analog or digital signals.

DETAILED DESCRIPTION OF THE DRAWING

Figure 1:
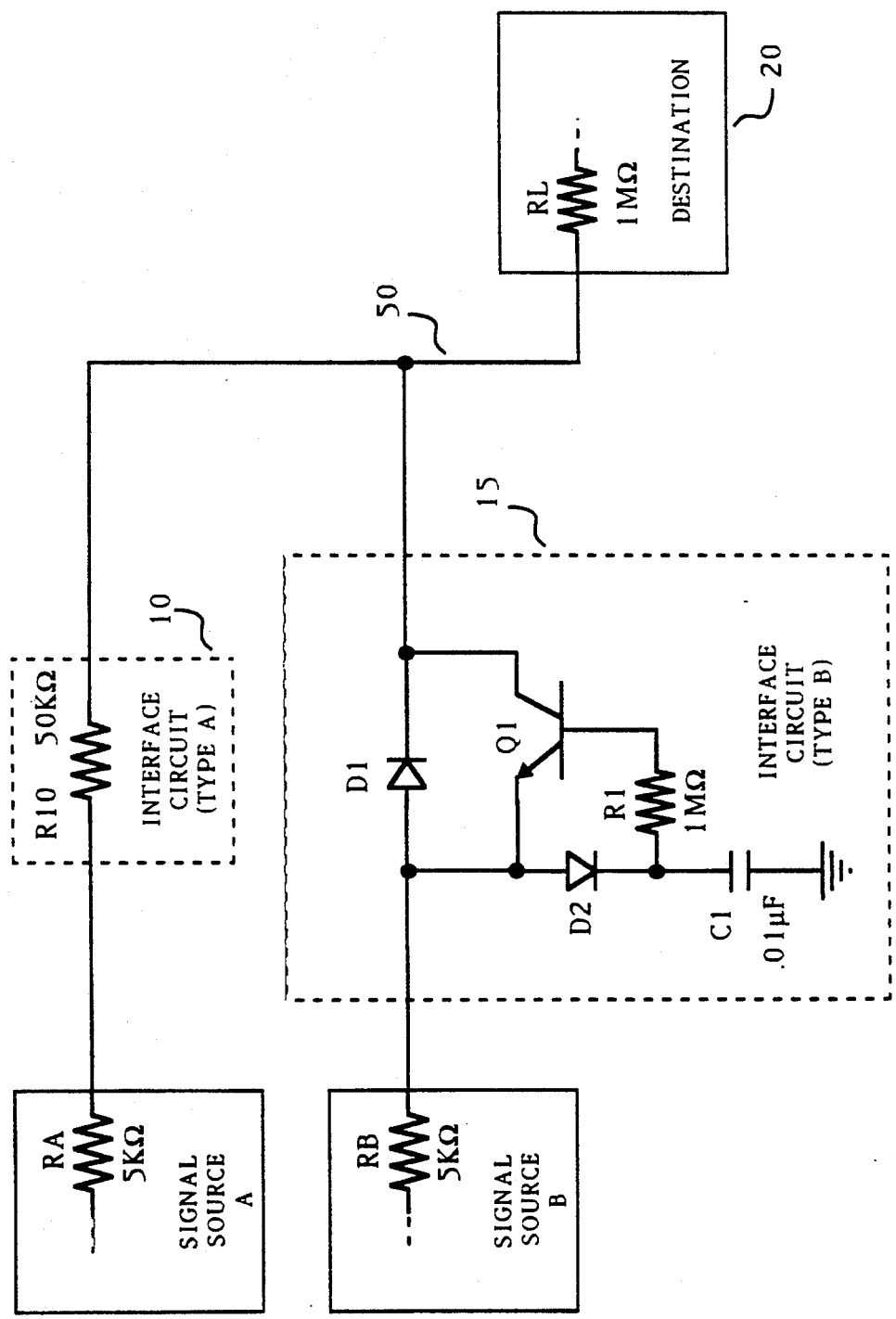
FIG. 1 shows, partly in block diagram form and partly in schematic form, an embodiment of the invention.

In FIG. 1, signal sources A and B are coupled to a shared communications line 50 via respective interface circuits 10 and 15. Interface circuits 10 and 15 operate to determine whether the signal from signal source A or the signal from signal source B will be coupled to a destination 20 via the shared communications line 50. As described further below, the operation of interface circuits 10 and 15 involves a switching or selection function responsive to signal activity from signal source B. The switching operation also involves assigning a higher priority to signals from signal source B. The prioritizing feature results from an interaction between the impedances of the signal paths from the signal sources A and B with the input impedance RL of destination 20.

As shown in FIG. 1, signal sources RA and RB exhibit respective source impedances RA and RB. Interface circuit 10 may comprise a current path, e.g. a resistor R10, coupled between signal source A and communications line 50. The embodiment of interface circuit 15 shown in FIG. 1 includes an input that is connected to signal source B, the emitter of a switching transistor Q1, and the anodes of diodes D1 and D2. The cathode of diode D1 and the collector of transistor Q1 are connected to communications line 50. As configured in FIG. 1, transistor Q1 provides a switched connection between signal source B and communications line 50. The switching action of transistor Q1 is controlled by a control voltage that is developed across a capacitor C1 and supplied to the base terminal of transistor Q1 via a resistor R1.

The control voltage across capacitor C1 is developed by the combination of a peak detector comprising diode D2 and capacitor C1 and a retriggerable timing circuit comprising capacitor C1 and resistor R1. The peak detector detects signal levels from signal source B that exceed a threshold level established in part by diode D2. The cathode of diode D2 is connected to the junction of capacitor C1 and a resistor R1 to enable the charging of capacitor C1 in response to the signal peaks of signal source B. The discharge path for capacitor C1 is through resistor R1 and the base-emitter junction of transistor Q1. As explained below, the charge-discharge cycle of capacitor C1 establishes a time period that determines the minimum duration of a conducting state of transistor Q1 in response to a signal peak from signal source B. The occurrence of additional signal peaks will retrigger the timing circuit to extend or repeat the conducting state of transistor Q1.

The embodiment shown in FIG. 1 may be used in a communication system between consumer electronic components. More specifically, signal sources A and B may comprise user-activated sources of control signals, such as a receiver for remote control signals or the control panel of a specific component, intended to control the operation of a variety of components connected to communications link 50. In the context of consumer electronics, destination 20 in FIG. 1 may comprise video, audio, or computer-related equipment.

Figure 2:
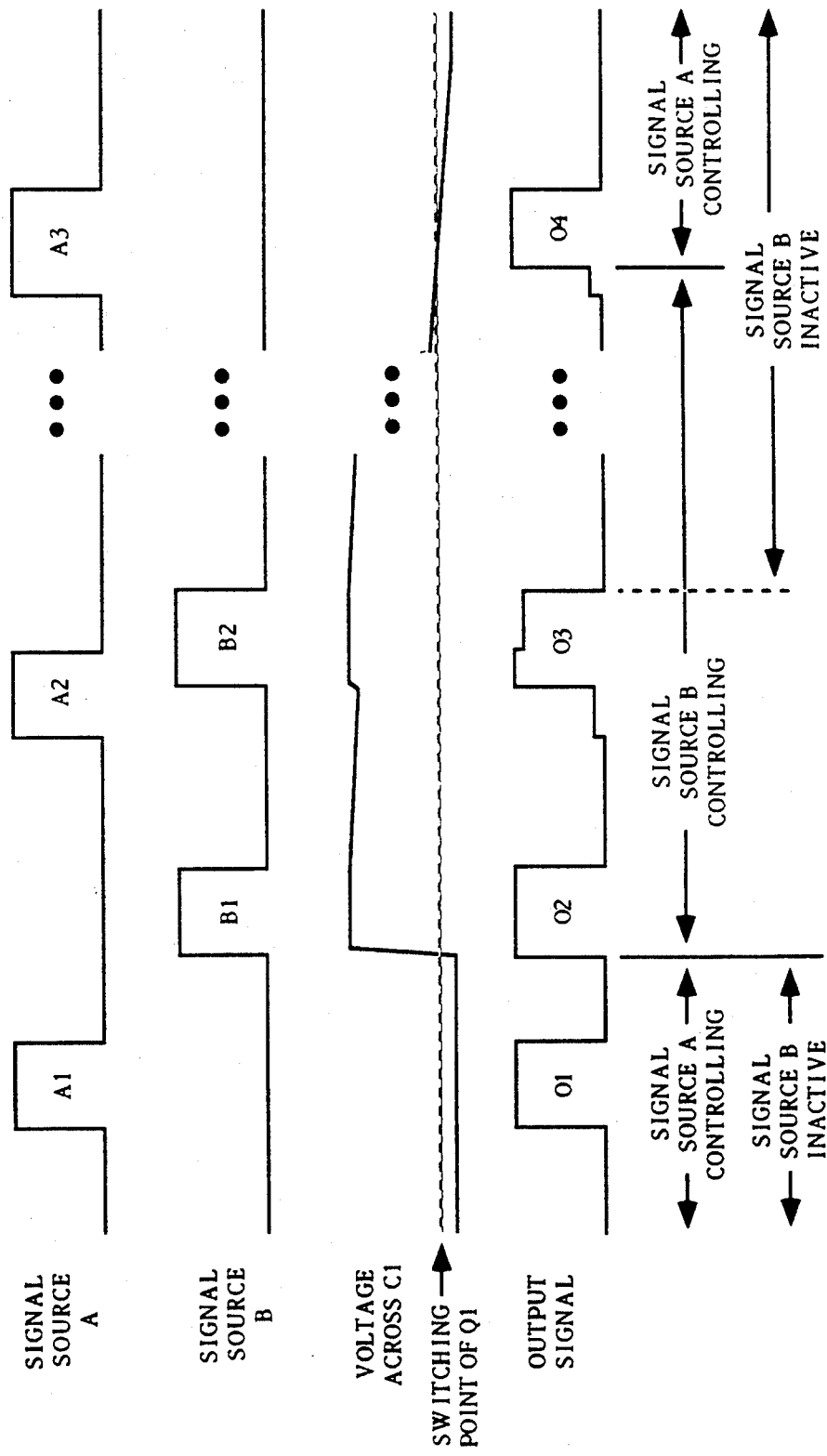
FIG. 2 shows signal waveforms useful in understanding the invention.

The operation of the embodiment shown in FIG. 1 will be described in the context of digital systems using the illustrative waveforms shown in FIG. 2. For the purposes of the following discussion, signal sources A and B will be presumed to be sources of digital pulse waveforms, as shown in FIG. 2, exhibiting logic 1 (high or a positive voltage e.g. +5 V) and logic 0 (low or ground) voltage levels. Also, assume initially that signal source B has been inactive (at logic 0) for an extended period of time and that capacitor C1 is discharged (VC1 approximately 0 V).

For the described initial condition, transistor Q1 is cutoff because the base-emitter voltage on Q1 (VBE) is zero. Also, diode D1 is reverse-biased. Thus, no connection exists between signal source B and communications line 50. However, signal source A is connected to communications line 50 via resistor R10. As a result, signal source A controls communications line 50 causing signals from signal source A to be provided to destination 20 via communications line 50. This condition is illustrated in FIG. 2 where pulse A1 appears as pulse O1 on communications line 50. Signal source A continues to control communications line 50 as long as signal source B is inactive.

When signal source B becomes active (pulses to logic 1), the initial pulse from signal source B causes capacitor C1 to charge to a voltage that is a diode voltage drop (diode D2) below the logic 1 voltage of the pulses from signal source B. The values of resistor RB and capacitor C1 are such that the time constant associated with the charging operation is negligible in comparison to the widths of the pulses from the signal sources. As a result, the charging period of C1 is relatively rapid as depicted by the rapid rise time on the C1 voltage waveform in FIG. 2. The voltage across capacitor C1 is connected to the base of transistor Q1 via resistor R1. Therefore, the return of the output of signal source B to logic 0 will cause the base-emitter voltage of transistor Q1 to be a positive value sufficient to switch transistor Q1 to a saturated conductive state.

Transistor Q1 provides a path for transmitting a logic 0 level from signal source B to communications line 50. More specifically, the above-described conductive state of transistor Q1 allows current to flow from communications line 50 to signal source B. Thus, transistor Q1 allows communications line 50 to be pulled to a voltage value approximating logic 0 in response to logic 0 levels from signal source B. The resulting logic 0 value on communications line 50 will differ from the logic 0 value at signal source B by the saturation voltage of transistor Q1.

Logic 1 levels from signal source B are transmitted to communications line 50 via a conduction path through diode D1. The current path through diode D1 is parallel to that through transistor Q1. However, the arrangement of diode D1 permits current to flow only in a direction opposite to current flow through transistor Q1, namely from signal source B to communications line 50. Thus, communications line 50 can be pulled to a voltage value approximating logic 1 in response to logic 1 levels from signal source B. The logic 1 voltage on communications line 50 will be offset from the logic 1 voltage at signal source B by the voltage drop across diode D1.

After C1 has been charged, the voltage stored on C1 will switch transistor Q1 to a conducting state when signal source B is at logic 0. However, when signal source B is low, capacitor C1 will slowly discharge through resistor R1 and the base-emitter junction of transistor Q1 into the source impedance RB of signal source B. The discharge time of capacitor C1, determined by the values of capacitor C1 and resistor R1, is selected to be long with respect to the pulse widths of the signal sources. The relatively slow discharge of capacitor C1 is indicated in FIG. 2 by the waveform that depicts the voltage across capacitor C1. The discharge time may be selected based on the length of messages from signal source B to insure that once signal source B becomes active message transmission may be completed without interference from signal source A.

As described, the occurrence of a pulse from signal source B enables interface circuit 15 and establishes a link between signal source B and communications line 50. However, activity from signal source B does not disable interface circuit 10 or disconnect signal source A from communications line 50. With both interface circuits 10 and 15 enabled, the signals from signal sources A and B will interact introducing a potential for corrupted data. The embodiment in FIG. 1 addresses the data corruption issue by incorporating a prioritizing scheme that is implemented by the described enabling action initiated by activity of signal source B operating in conjunction with the relative values of the impedances {RA+R10}, RB, and RL. The order of magnitude difference between resistances {RA+R10} and RB and between resistances {RA+R10} and RL dictates that signals on communications line 50 from signal source B will dominate over the signals from signal source A.

The prioritization provided by the relative impedances is illustrated in FIG. 2. While signal source A is controlling (signal source B inactive for an extended period of time), pulses from signal source A appear on communications line 50 (pulse A1 corresponding to pulse O1). Similarly, when signal source A is inactive, pulses from signal source B appear on communications line 50, e.g. pulse B1 corresponding to pulse O2. However, if signal source B is in control (capacitor C1 is not discharged) and signal source A pulses to a logic state opposite that of signal source B, the order of magnitude difference between resistances {RA+R10} and RB causes the logic levels from signal source B to dominate over the logic levels from signal source A. The domination of signal source B over signal source A is illustrated in FIG. 2 by the interaction of pulses A2 and B2 to produce the stepped waveform comprising pulse O3 on communications line 50.

To better understand the domination of signal activity from signal source B over signal source A, first consider the situation when signal source A is at logic 1 and signal source B is at logic 0. When signal source B is at logic 0, the series combination of resistor RB and the low impedance of saturated transistor Q1 is effectively in parallel with resistor RL. The resulting equivalent resistance is an order of magnitude less than the series combination of resistors RA and R10. The described equivalent resistance and the resistor combination {RA+R10} creates a voltage divider that produces a signal level on communications line 50 that is approximately 1/10 of the signal level from signal source A. Thus, regardless of the state of signal source A, a voltage sufficient to establish a logic 0 level is produced on communications line 50 in response to a logic 0 from signal source B.

If signal source B is at logic 1 while signal source A is at logic 0, the series combination of resistors RA and R10 is effectively in parallel with resistor RL. The resulting equivalent resistance is an order of magnitude greater than the resistance of resistor RB in series with forward biased diode D1. Voltage division of the logic 1 signal level from signal source B across resistor RB, diode D1, and the described equivalent resistor ({RA+R10} in parallel with RL) produces a signal level on communications line 50 that is approximately 9/10 of the logic 1 level from signal source B. Thus, regardless of the state of signal source A, a voltage sufficient to establish a logic 1 level is produced on communications line 50 in response to a logic 1 from signal source B.

When signal source B has been inactive (at logic 0) for a period sufficient to permit capacitor C1 to discharge to a voltage that is insufficient to turn transistor Q1 on, signal source A will regain control of communications line 50. Signal source A taking control of communications line 50 is illustrated by pulses A3 and O4 in FIG. 2. At the point where the voltage across capacitor C1 drops below the switching point of transistor Q1, the relatively low impedance RB of signal source B is disconnected (interface circuit 15 disabled) from communications line 50. Signal source A may then control communications line 50 through the higher impedance {RA+R10}. As a result, the full amplitude of pulse A3 appears as pulse O4 on communications line 50.

As described, control of shared communications line 50 switches to signal source B when signal source B becomes active. If signal sources A and B are asynchronous, signal source B may become active and take control while signal source A is actively communicating with destination 20. The interruption and termination of the message from signal source A could result in an unexpected action by destination 20. Therefore, the use of asynchronous signal sources necessitates including error detection and correction capability within the communications system. For example, signals from signal sources A and B may be formatted to include information that can be interpreted by circuitry in destination 20 to effect the required error detection and correction. Various message formats that facilitate error detection and correction are known. As an example, a message format may be used that comprises a fixed number of pulses representative of both the intended message data and the logical complement of the message data.

In addition to error detection and correction, creating a communications system with acceptable error rates also requires maintaining signal levels that satisfy the signal level noise margin requirements of the system. For example, in a digital system employing the embodiment shown in FIG. 1, logic level signals on communications line 50 from signal sources A and B must meet the logic level noise margin specifications of destination 20. In FIG. 1, noise margin concerns necessitate considering the voltage drops across interface circuits 10 and 15. In particular, the forward-bias voltage drop across diode D1 and the saturation voltage of transistor Q1 should be minimized by selecting appropriate components.

Also, the values of the signal path impedances in FIG. 1 are important in regard to maintaining noise margins. Determining the required values of the signal path impedances involves considering the input impedance RL of destination 20 and the values of impedances {RA+R10} and RB. In general, the value of impedance RL should be substantially greater than the value of impedance {RA+R10} and the value of impedance {RA+R10} should be substantially greater than the value of impedance RB. A more specific design guideline useful for defining desirable values of impedances RA, R10, and RB is that there should be an order of magnitude difference between impedances RL and {RA+R10} and also between impedances {RA+R10} and RB. The component values shown in FIG. 1 follow this guideline.

System constraints other than noise margin, e.g. signal levels, data rate, pulse widths, pulse repetition rates, and message length, may affect the determination of an appropriate duration for the timing period established by resistor R1 and capacitor C1 in FIG. 1. The particular application involved will dictate the factors that must be considered when selecting values for resistor R1 and capacitor C1. For example, the signal levels from signal source B determine the voltage on capacitor C1 and the discharge time of capacitor C1. Therefore, changing the range of signal values from signal source B will vary the timing period. The component values shown in FIG. 1 are an example of values that would be appropriate for applications involving communications between consumer electronic components using typical 5 V digital signal values.

Figure 3:
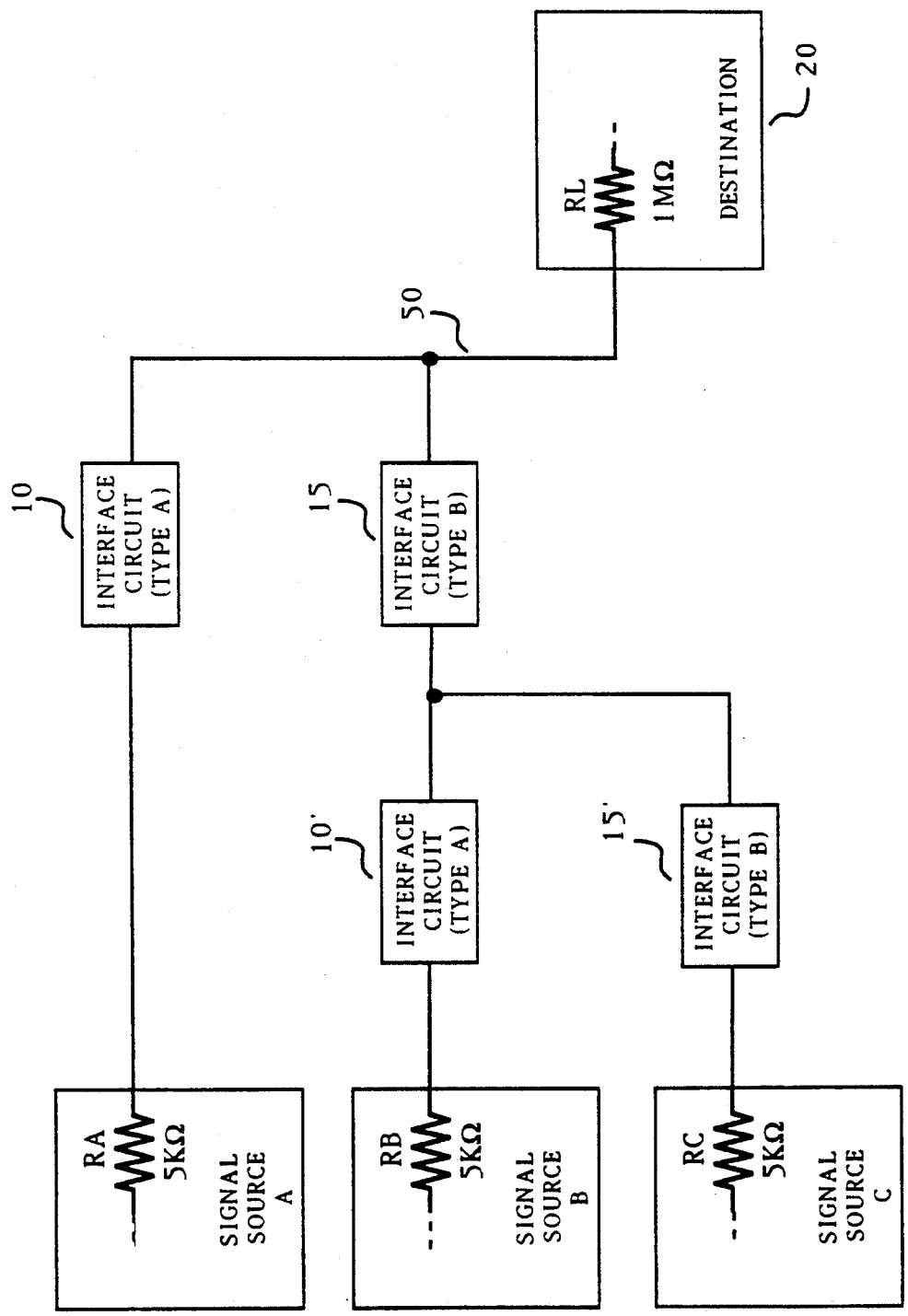
FIG. 3 shows another embodiment of the invention.

FIGS. 1 and 2 relate to an embodiment involving two signal sources and a single destination. FIG. 3 illustrates an embodiment of the invention which accommodates additional signal sources. Additional inputs may be added by connecting in cascade replicated versions of the interface circuit topology shown in FIG. 1. For example, in FIG. 3, interface circuits 10 and 15 shown in FIG. 1 have been replicated to create interface circuits 10', and 15' respectively. The connection of interface circuits 10' and 15' to the input of interface circuit 15 provides a third prioritized input. The circuit shown in FIG. 3 may be expanded to provide for additional inputs by further replication of interface circuits 10 and 15. As signal sources are added, the relative impedances of the various interface circuits may require adjustment to insure maintaining required noise margins. For example, the above-described noise margin design guideline that suggests maintaining an order of magnitude difference between impedances of the signal paths may be applied to the embodiment in FIG. 3. Assuming in FIG. 3 that the signal sources each have impedances of 5KΩ and that the input impedance RL of destination 20 is 1MΩ, selecting values of 200KΩ and 50KΩ for the resistances of interface circuits 10 and 10', respectively, will satisfy the stated guideline.

Multiple destinations may also be connected to communications line 50. In the case of multiple destinations, either all destinations may receive and interpret all signals or a series of address bits may be included in a message as a prefix to a data word. If address bits are used, each destination would be assigned an address and recognize only those messages containing the correct address. Including address bits in the signal format would require additional coding and decoding circuitry for generation and interpretation of the address bits. Also, multiple destinations may alter the impedance of the shared communications line (impedance RL in FIG. 1). Significant variations of the impedance of the shared communications line may require adjusting the value of the other impedances shown in FIG. 1.

The particular embodiment of the interface circuits shown in FIG. 1 does not dictate the format of the signals involved. For example, signal sources A and B shown in FIG. 1 may be sources of digital or analog signals. As described above, signals from signal source B in FIG. 1 dominate over signals from signal source A; in the exemplary embodiment, signal source A is not disconnected. Therefore, a reduced amplitude version of the signals from signal source A are superimposed on the signals from signal source B when signal source B is active. For an analog application, the presence of signals from signal source A while signal source B is active would introduce noise. The tolerable level of noise from signal source A would depend on the specific analog application involved and should be considered when determining a value for resistor R10. In addition, as described above, the signal levels from the signal sources affect the timing period provided by the combination of capacitor C1 and resistor R1. Thus, the signal amplitude range from an analog signal source may impact the values selected for resistor R1 and capacitor C1.

The described modifications and other modifications are contemplated to be within the scope of the invention defined by the following claims.

What is claimed is:

1. Apparatus comprising:
   a first input for receiving a first input signal from a first input signal source exhibiting a first impedance;
   a second input for receiving a second input signal from a second input signal source exhibiting a second impedance;
   an output coupled to said first input for providing an output signal to a signal destination exhibiting a third impedance;
   switch means for selectively coupling said second input to said output in response to signal levels of said second input signal, said switch means including:
   means coupled to said second input for detecting changes of said second input signal from a first level to a second level and from said second level to said first level; and
   means coupled to said detection means for establishing a timing period; wherein
   said switch means exhibits a first state during which said second input is decoupled from said output causing said output signal at said output to be representative of said first input signal;
   said switch means exhibits a second state during which said second input is coupled to said output causing said output signal to be representative of said second input signal;
   said switch means exits said first state and enters said second state when said second input signal changes from said first level to said second level;
   said switch means exits said second state and enters said first state following completion of said timing period;
   said timing means 1) begins said timing period when said second input signal first changes from said second level to said first level, 2) retriggers to begin said timing period in response to each subsequent change of said second input signal from said second level to said first level, and 3) prevents completion of said timing period when said second input signal changes from said first level to said second level during said timing period;
   said first impedance is substantially less than said third impedance and substantially greater than said second impedance.

2. The apparatus of claim 1, wherein said switch means further comprises a bipolar transistor having an emitter terminal coupled to said second input and a collector terminal coupled to said output.

3. The apparatus of claim 2, wherein said detection means comprises a diode coupled between said emitter terminal and a base terminal of said bipolar transistor.

4. The apparatus of claim 2, wherein said timing means comprises a capacitor and a resistor coupled in series between a source of reference potential and a base terminal of said bipolar transistor.

5. The apparatus of claim 2, wherein said switch means further comprises a diode having an anode terminal coupled to said second input and a cathode terminal coupled to said output.

6. Apparatus comprising:
   a first input for receiving a first input signal from a first input signal source exhibiting a first impedance;
   a second input for receiving a second input signal from a second input signal source exhibiting a second impedance;
   an output for providing an output signal to a signal destination exhibiting a third impedance;
   a current path exhibiting a path impedance for coupling said first input to said output;
   switch means for selectively coupling said second input to said output in response to signal levels of said second input signal, said switch means including:
   means coupled to said second input for detecting changes of said second input signal from a first level to a second level and from said second level to said first level; and
   means coupled to said detection means for establishing a timing period; wherein
   said switch means exhibits a first state during which said second input is decoupled from said output causing said output signal at said output to be representative of said first input signal;
   said switch means exhibits a second state during which said second input is coupled to said output causing said output signal to be representative of said second input signal;
   said switch means exits said first state and enters said second state when said second input signal changes from said first level to said second level;
   said switch means exits said second state and enters said first state following completion of said timing period;
   said timing means 1) begins said timing period when said second input signal first changes from said second level to said first level, 2) retriggers to begin said timing period in response to each subsequent change of said second input signal from said second level to said first level, and 3) prevents completion of said timing period when said second input signal changes from said first level to said second level during said timing period;
   said path impedance of said current path added to said first impedance forms a combined impedance that is substantially less than said third impedance and substantially greater than said second impedance.

7. The apparatus of claim 6, wherein said switch means further comprises a bipolar transistor having an emitter terminal coupled to said second input and a collector terminal coupled to said output.

8. The apparatus of claim 7, wherein said detection means comprises a diode coupled between said emitter terminal and a base terminal of said bipolar transistor.

9. The apparatus of claim 7, wherein said timing means comprises a capacitor and a resistor coupled in series between a source of reference potential and a base terminal of said bipolar transistor.

10. The apparatus of claim 7, wherein said switch means further comprises a diode having an anode terminal coupled to said second input and a cathode terminal coupled to said output.

11. Apparatus comprising:
a first input for receiving a first input signal from a first input signal source exhibiting a first impedance;
a second input for receiving a second input signal from a second input signal source exhibiting a second impedance substantially less than said first impedance;
an output coupled to said first input for providing an output signal to a signal destination exhibiting a third impedance substantially greater than said first impedance;
switch means responsive to a control signal for decoupling said second input from said output in a first mode of operation causing said output signal at said output to represent said first input signal, and for coupling said second input to said output in a second mode of operation causing said output signal to represent said second input signal; and
means responsive to said second input signal for generating said control signal so that said switch means exits said first mode of operation and enters said second mode of operation when said second input signal changes from a first level to a second level, and so that said switch means exits said second mode of operation and enters said first mode of operation following completion of a timing period;
said control means including timing means for establishing said timing period such that 1) a first change of said second input signal from said second level to said first level causes said timing means to begin said timing period, 2) each subsequent change of said second input signal from said second level to said first level retriggers said timing means causing said timing means to begin said timing period, and 3) completion of said timing period is prevented when said second input signal changes from said first level to said second level during said timing period.

12. The apparatus of claim 11, wherein said switch means comprises a bipolar transistor having an emitter terminal coupled to said second input and a collector terminal coupled to said output.

13. The apparatus of claim 12, wherein said control signal generating means comprises means coupled between said second input and a base terminal of said bipolar transistor for detecting a signal level change of said second input signal.

14. The apparatus of claim 13, wherein said control signal generating means further comprises means coupled to said detection means and to said base terminal of said bipolar transistor for establishing said predetermined timing period.

15. The apparatus of claim 12, wherein said switch means further comprises a diode having an anode terminal coupled to said emitter terminal of said bipolar transistor and a cathode terminal coupled to said collector terminal of said bipolar transistor.

* * * * *